United States Patent [19]

Axten et al.

[11] Patent Number: 5,250,986
[45] Date of Patent: Oct. 5, 1993

[54] PERIPHERAL UNIT CONTROL PANEL WITH SMART KEY

[75] Inventors: Bruce Axten; Richard Beaufort, both of Boise, Id.

[73] Assignee: Hewlett-Packard Company, Palo Alto, Calif.

[21] Appl. No.: 879,670

[22] Filed: May 6, 1992

[51] Int. Cl.⁵ .............................................. B41J 29/38
[52] U.S. Cl. .................................... 355/206; 355/209; 341/23; 395/101
[58] Field of Search ................ 355/209, 206; 364/146, 364/188, 234.2; 340/711, 712, 825.06; 395/101, 106, 112; 341/23

[56] References Cited

U.S. PATENT DOCUMENTS

| | | | |
|---|---|---|---|
| 4,567,322 | 1/1986 | Tsuda | 379/100 |
| 4,836,699 | 6/1989 | Babsch et al. | 340/711 X |
| 4,994,988 | 2/1991 | Yokoi | 395/112 |
| 5,121,113 | 6/1992 | Kedge et al. | 340/712 |

FOREIGN PATENT DOCUMENTS 2-24183 1/1990 Japan.

*Primary Examiner*—Joan H. Pendegrass

[57] ABSTRACT

A peripheral unit is provided with a control panel that includes a plurality of indicators, each indicator displaying to a user a state condition of the peripheral unit. The control panel also includes a user operable key. A "state" circuit is responsive to a functional state of the peripheral unit to cause the state indicators to manifest a selected one of a set of state conditions. A controller is provided for initiating peripheral unit operations. A state logic machine is responsive to each manifested state of the set and user actuation of the key, to cause the controller to initiate a peripheral unit operations, that operation uniquely related to a state manifested by the indicators.

8 Claims, 2 Drawing Sheets ical flow diagram illustrating responses
PERIPHERAL UNIT CONTROL PANEL WITH SMART KEY

FIELD OF THE INVENTION

This invention relates to a peripheral unit control panel, and more particularly, to a control panel that exhibits peripheral unit status and includes a single user-operable key that enables a peripheral unit action, dependent upon the peripheral unit's exhibited status.

BACKGROUND OF THE INVENTION

Peripheral units such as printers, facsimile machines, plotters, etc. provide detailed status information via electronic signals to a controlling host computer, where such information is employed to both control the peripheral unit and to provide information regarding the unit's status to a user via a host-controlled display. Such peripheral units also often include a resident control panel that provides limited user feedback regarding the peripheral unit's status.

In prior art printers, control panel designs have used dedicated buttons to enable specific printer functions in response to control panel condition indications. For example, different buttons were provided for font prints, form feed, and other control functions. Notwithstanding substantial care being taken in the design of the control panel interface, user confusion occurred when trying to decide which button or key to push in response to an indicated peripheral unit condition.

The inclusion of a plurality of keys in the peripheral unit keyboard also added to the cost of the equipment and, if the equipment was to be used in non-English speaking markets, required the provision of separate key faces or templates in the languages of the various foreign markets in which sales were to occur.

Accordingly, it is an object of this invention to provide a simplified control panel for a peripheral unit wherein only a single key is required.

It is another object of this invention to provide an improved control panel for a peripheral unit wherein a single key is provided that has a variable function, depending upon an indicated peripheral unit condition.

It is yet another object of this invention to provide an inexpensive control panel for a printer.

SUMMARY OF THE INVENTION

A peripheral unit is provided with a control panel that includes a plurality of indicators, each indicator displaying to a user a state condition of the peripheral unit. The control panel also includes a user operable key. A "state" circuit is responsive to a functional state of the peripheral unit to cause the state indicators to manifest a selected one of a set of state conditions. A controller is provided for initiating peripheral unit operations. A state logic machine is responsive to each manifested state of the set and user actuation of the key, to cause the controller to initiate a peripheral unit operation, that operation uniquely related to a state manifested by the indicators.

DETAILED DESCRIPTION OF THE INVENTION

The invention will be described in the context of a printer, however, it is to be understood that the invention is equally applicable to other peripheral units that include control panels for indicating the unit's condition and that provide input means for altering that condition.

Figure 1:
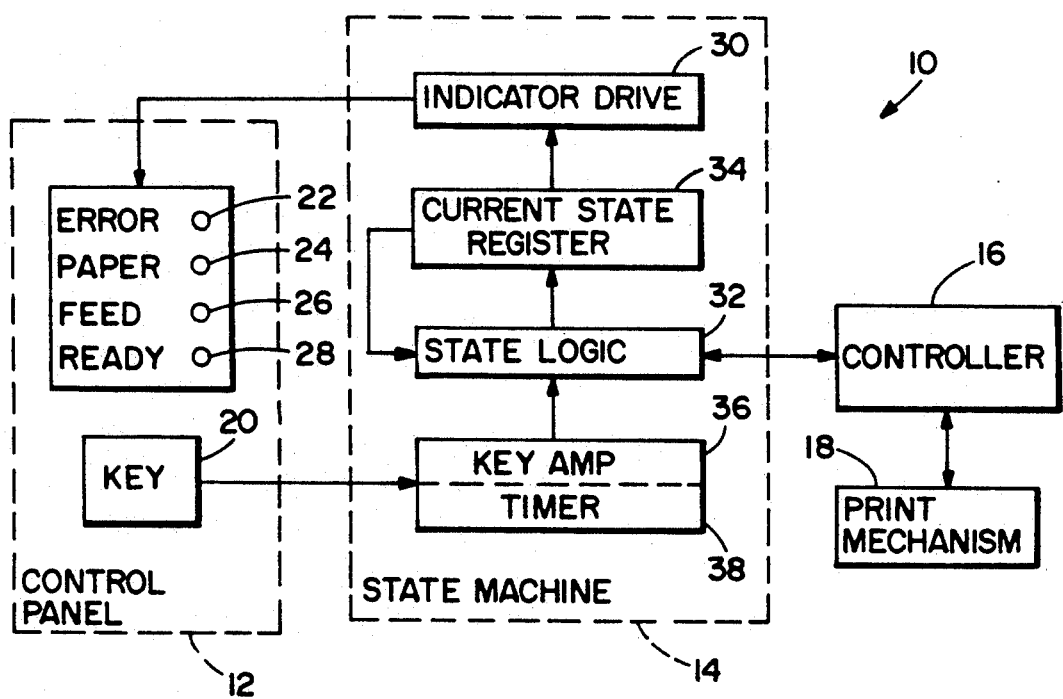
FIG. 1 is a high level block diagram illustrating the invention.

Referring now to FIG. 1, printer 10 comprises a control panel 12, a state machine 14, a controller 16 and a print mechanism 18. Control panel 12 includes a single, user-operable key 20 and a plurality of status indicators 22, 24, 26 and 28. The condition of each indicator (ON, OFF, FLASHING) is controlled from an indicator drive circuit 30 in state machine 14.

The operation of state machine 14 is controlled by state logic module 32. Current state register 34, in response to an input from state logic module 32, indicates the current state of printer 10. Current state register 34 thus controls indicator drive 30 to cause the indicators in control panel 12 to manifest the correct current printer state. An output from current state register 34 is also employed by state logic module 32 in responding to an input from key 20. That input is applied via a key amplifier 36 which also includes a timer 38. As will be hereafter understood, if a user momentarily depresses key 20, key amplifier 36 signals that action to state logic module 32. By contrast, if a user depresses key 20 and maintains it depressed for a preset period of time (e.g. 2 seconds), timer 38 times out and provides a reset signal to state logic module 32.

The principal input to state logic module 32 derives from controller 16 which, in turn, indicates the state of print mechanism 18. Any change of state in print mechanism 18 that might require user intervention is signalled by controller 16 to state logic module 32. In response, state logic module 32 reflects the changed state by altering the contents of current state register 34 to manifest the new state. Indicator drive 30 responds to the new state indication by altering indicators 22, 24, 26 or 28 on control panel 12 to properly reflect the new state. For a set of indicated states, an actuation of key 20 will cause a change of that state. Thus, the action of the printer in response to an actuation of key 20 is automatically altered in accordance with the manifested state evident on control panel 12.

Prior to discussing the operation of the system of FIG. 1, the function of each of indicators 22, 24, 26, and 28 will be described. It is to be understood that the listed functions are exemplary and others may be substituted within the spirit of the invention. Error indicator 22, when ON, indicates that a printer error has occurred. It will light to the ON state for a Door Open or a No Toner Cartridge condition in the printer. Error indicator 22 will flash if a memory error has occurred. A memory error occurs because data sent to the printer was either too much for the memory or too complex.

Paper indicator 24 will turn ON in the event of a Paper Out. If Ready indicator 28 is ON, it will go OFF when Paper indicator 24 turns ON. If Paper indicator 24 is flashing, it indicates Paper Jam.

Feed indicator 26 shows the status of data in the printer. If it is OFF, there is no data in the machine. If it is ON, printer 10 has printable data. If it is flashing, the printer is in a Manual Feed state.

Ready indicator 28 is used to signal the ready status of the printer. If ON, the printer is ready (it can receive data). If it is blinking, then the printer is Ready and either processing data or printing data. If the indicator is OFF, the printer is not ready.

The printer can be thought of as having a number of distinct states: printer ready, printer busy, manual feed, paper error, printer error and fatal error. Certain of those states are indicated by a different combination of indicators 22, 24, 26 and 28. The details of each of the states relevant to this invention are discussed below.

PRINTER READY

This state is signified by Ready indicator 28 being either ON or blinking. It indicates that the printer may accept data and key presses.

PRINTER BUSY

This state is signified by indicators 22, 24, 26 and 28 turning ON and OFF in a repeated sequence. This state occurs when the printer initializes or performs a reset.

PRINTER ERROR

This state indicates a non-fatal error has occurred. It is indicated by Error indicator 22 either turning ON or blinking. No printing can be done until the error is either cleared or overridden. It serves to indicate a Door Open/No Toner Cartridge (ON) or a Memory Error (Blinking).

MANUAL FEED

When either a manual feed command or an envelope size is requested, Feed indicator 26 begins flashing to indicate that the user must alter the paper set-up. Either a sheet must be placed in the manual feed slot of the printer or key 20 must be pressed to cause an override.

PAPER ERROR

A Paper Out or a Paper Jam will cause printer 10 to enter this state. A user must clear the error. A Paper Out automatically recovers after the error is cleared, whereas a Paper Jam requires a Key Press or Door Close to recover. In this condition, Ready indicator 28 is turned OFF, paper indicator 24 is turned ON (for Paper Out) or flashes (for Paper Jam), and all paper motion is stopped.

FATAL ERROR

This state is caused by printer 10 encountering an error that cannot be recovered from. Such errors arise from hardware or firmware errors. In this state, all four indicators 22, 24, 26 and 28 are ON and, if the user presses key 20, a pattern is displayed on indicators 22, 24, 26 and 28 that indicates what the error was.

As above indicated, state logic module 32 recognizes two actions of key 20. A key press following by an immediate release causes the actuation of a command and a possible change of state. A key press and hold (e.g. for two seconds) results in a reset action. This causes all data in the printer to be lost, and all personality parameters to be reset to default states. The printer then returns to the Ready state and is prepared to continue upon receipt of new data.

Figure 2:
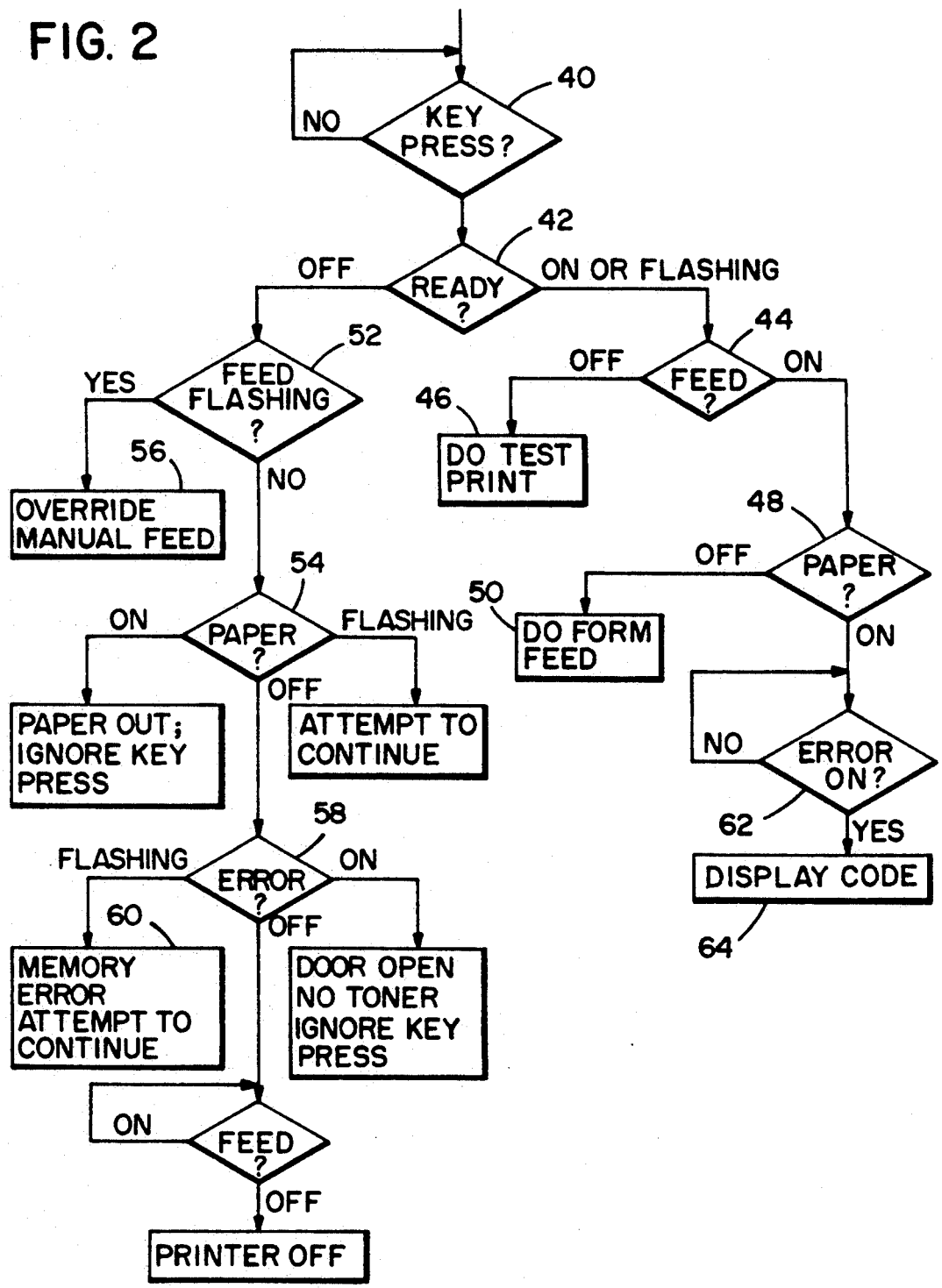
FIG. 2 is a logical flow diagram illustrating responses of the state machine shown in FIG. 1 to various manifested peripheral unit states, when the key is depressed.

As will be seen from a description of FIG. 2, a simple depression of key 20 causes different functions to be performed, based upon what condition is manifested by indicators 22, 24, 26 and 28. For example, if Ready indicator 28 is ON and there is no data (Feed indicator 26 is OFF), pressing key 20 results in a test printout. A test printout consists of the printer's environment and personality variables being printed along with a listing of all fonts internal to the printer. In other words, the user is enabled to examine the printer's initial conditions and settings via the printout. By contrast, if the printer is in the Ready state (Ready indicator 22 ON) and there is data (Feed indicator 26 is ON), pressing key 20 results in a form feed. The form feed action insures that a form feed character is logically placed at the end of the data stream. Thus, a page is ejected from the printer with whatever data is in the memory (and to which a form feed character was appended).

Turning now to FIG. 2, a flow diagram illustrates actions that occur in various states when key 20 is pressed (box 40). If Ready indicator 28 (box 42) is ON or flashing and Feed indicator 26 (box 44) is OFF, a test printout occurs (box 46). If, however, Feed indicator 26 is in the ON state and Paper indicator 24 is OFF (box 48), a key press causes a form feed (box 50). This action causes whatever data is in the memory to be printed out.

In the case where Ready indicator 28 (box 42) is OFF, Feed indicator is not flashing, and Paper indicator 24 is flashing (box 54), a key press will cause a Continue from a paper jam (if the paper has been cleared from the printer). It will be recalled that the flashing of Paper indicator 24 is indicative of a paper jam.

If Feed indicator 20 is flashing (box 52), a depression of key 20 causes the printer to override the Manual feed (Box 56) and feed from the paper tray. Recall that Indicator 26 flashing is indicative of the Manual feed state.

If Ready indicator 28 is in the OFF state (box 42) and Error indicator 22 is flashing (box 58), a key press will attempt to override the error state (box 60). It will be recalled that a flashing Error indicator is indicative of a memory error, where either two much data has been sent to the printer or it was too complex for the printer's memory capacity. The depression of key 20 causes the printer to continue from this error and may cause the printout of a portion of the data on one page and the rest of the data on another page.

Finally, if all indicators 22, 24, 26 and 28 are in the ON state (boxes 42, 44, 48 and 62), a key press will cause a display of a code (box 64) which identifies the particular error condition within the printer.

The above recitations of conditions and responses to key presses are exemplary and not meant to be all encompassing. In essence, the function of key 20 is altered by state logic module 32 in accordance with the condition existing in current state register 34. Thus, a single key is enabled to perform a multiplicity of control functions, strictly dependent upon a current indicated state of the printer, as manifest by a plurality of indicators ON control panel 12.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. In a peripheral unit, the combination comprising:
  a control panel including a plurality of indicators, each indicator for displaying to a user a state condition of said peripheral unit, and a user operable key;
  current state means responsive to a functional state of said peripheral unit to cause said indicators to manifest a selected one of a set of peripheral unit states, said current state means enabling an indicator to be in an ON condition, an OFF condition or a FLASHING condition, each said condition manifesting a different state of said peripheral unit;

control means for initiating peripheral unit operation;

state logic means responsive to each manifested state of said set and an actuation of said key, to cause said control means to initiate a peripheral unit operation, said operation uniquely related to a state manifested by said indicator; and timer logic means responsive to an actuation of said user operable key for a period that is at least equal to a predetermined time period to effect a reset action, said reset action occurring in lieu of a peripheral unit operation that would be initiated by an actuation of said user operable key for a period less than said predetermined time period.

2. The peripheral unit as recited in claim 1 wherein said unit includes a printer function.

3. The peripheral unit as recited in claim 2 wherein a first indicator indicates a readiness state and a second indicator indicates a data/feed state, an ON condition of said first indicator, an OFF condition of said second indicator, and an actuation of said key causing said peripheral unit to provide a test output document.

4. The peripheral unit is recited in claim 3 wherein an ON condition of said first indicator, an ON condition of said second indicator and an actuation of said key causes a form feed from said peripheral unit, said form feed providing a document containing data stored in said peripheral unit.

5. The peripheral unit as recited in claim 4 wherein a third indicator indicates a plurality of paper states, an ON condition indicating a paper out and a flashing condition indicating a paper jam, and wherein a flashing state of said third indicator, OFF states of said first and second indicators and a key press causes an attempt to continue in said peripheral unit.

6. The peripheral unit as recited in claim 5 wherein an OFF condition of said first indicator and a flashing condition of said second indicator serves to indicate Manual Feed, and wherein a key press causes said peripheral unit to override said Manual Feed and revert to an automatic Feed state.

7. The peripheral unit as recited in claim 6 wherein a fourth indicator manifests plural error states, an ON condition indicating a peripheral unit error and a flashing condition indicating a possible memory error, a flashing condition of said fourth indicator in combination with OFF conditions of said first and second indicators, and a key press causing said peripheral unit to attempt to override said error condition.

8. The peripheral unit as recited in claim 7 wherein simultaneous ON conditions of said first through fourth indicators and a key press causes a display on said indicators of a code to indicate a malfunction state of said peripheral unit.

* * * * *